Jan. 27, 1970    J. M. VERGOZ    3,491,453
INERTIAL REFERENCE ATTITUDE READOUT DEVICE
Filed April 25, 1966                 2 Sheets-Sheet 1

INVENTOR.
JOHN M. VERGOZ
BY Edward Dugas
AGENT

Jan. 27, 1970  J. M. VERGOZ  3,491,453

INERTIAL REFERENCE ATTITUDE READOUT DEVICE

Filed April 25, 1966  2 Sheets-Sheet 2

INVENTOR.
JOHN M. VERGOZ
BY Edward Dugas
AGENT

United States Patent Office 3,491,453
Patented Jan. 27, 1970

3,491,453
INERTIAL REFERENCE ATTITUDE READOUT DEVICE
John M. Vergoz, Brea, Calif., assignor to North American Rockwell Corporation, a corporation of Delaware
Filed Apr. 25, 1966, Ser. No. 545,004
Int. Cl. G01c *19/34, 19/44*
U.S. Cl. 33—204                                    6 Claims

ABSTRACT OF THE DISCLOSURE

An attitude readout device for detecting the attitude between a gimballess floated inertial platform and a supporting structure wherein ultrasonic transmitters and receivers are positioned upon the platform and supporting structure, the transmitters are pulsed and the time difference between the receipt of the pulse at the receiver is proportional to the angle between the transmitter and receivers. Attitude angle information from the receivers is converted to digital form and may be directly applied to standard system computers for conversion to the euler angles required for most navigation purposes.

---

This invention relates to an attitude readout device for detecting the attitude between a gimballess floated inertial platform and a supporting structure and more particularly to a readout device which utilizes ultrasonic transmitters and receivers positioned upon the platform and supporting structure to determine attitude.

There presently exists in the state of the inertial art navigation systems which utilize a spherical inertial platform supported inside of a spherical outer structure by a film of fluid. This construction allows a vehicle to which the spherical outer structure is attached to assume any attitude or to make any succession of maneuvers throughout which the inner sphere will maintain a fixed or stable position relative to inertial space. One such system is described in U.S. Patent No. 3,056,303, entitled "Hydraulically and Spherically Supported Inertial Reference," by Arthur F. Naylor.

The major deterrent to the effective utilization of such systems has been the difficulty of accurately determining the angular relationship between the inner sphere and the outer sphere or vehicle. In accordance with the present invention ultrasonic transmitters are affixed to one of the spheres and ultrasonic receivers are affixed to the other sphere. The time of ultrasonic wave propagation from the pulsed ultrasonic transmitters to the receivers will be proportional to the shortest ultrasonic distance, and in turn to the great circle angular distance, circumferential distance, between the transmitters and receivers.

In a more specific aspect of the invention involving the determination of the angular relationship of the spheres in one plane, two transmitters are affixed to opposite sides of one of the spheres and four receivers are affixed to opposite sides of the other sphere.

One of the transmitters is pulsed and the time difference between receipt of the pulse at the receivers is proportional to the great circle angle between the transmitter and receivers. By measuring this angle twice with diametrically opposite transmitters and receivers, all repeatable delays cancel and the transmitters and receivers need not be a point source or sink as long as their solid angles are equally distributed about opposite diameters of the spheres. In order to avoid using this technique when a transmitter receiver overlap condition occurs, two pairs of receivers are utilized for each angle measurement and the pair of receivers are selected which do not overlap the transmitters. Attitude angle information from the receivers is converted to digital form and may be directly applied to standard system computers for conversion to the euler angles required for most navigation purposes.

It is therefore an object of the present invention to provide an improved attitude readout device.

It is a further object of this invention to provide an attitude readout device which utilizes ultrasonic waves.

It is a further object of this invention to provide a device for accurately determining all of the angular relationships between two elements.

It is a further object of this invention to provide an attitude readout device the output of which can be easily applied to a digital computer.

Other objects of this invention will become apparent from the following description taken in connection with the accompanying drawings of which:

Figure 1:
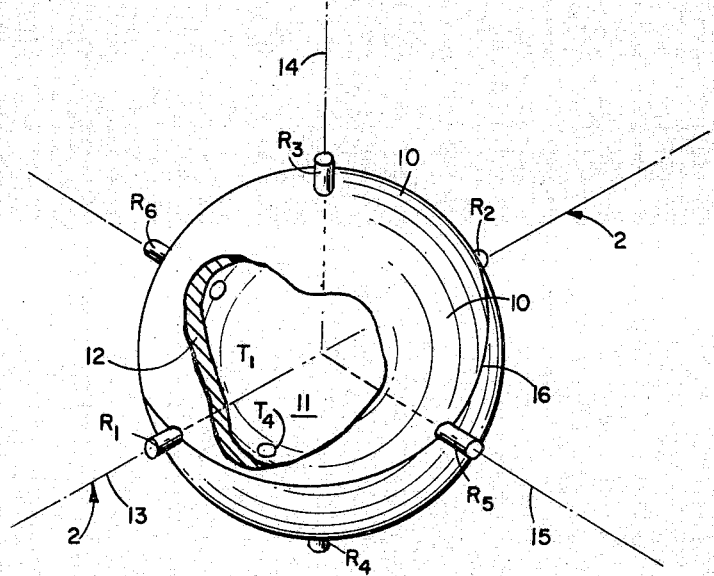
FIG. 1 is a partially cutaway perspective view of one embodiment of the present invention.
Figure 2:
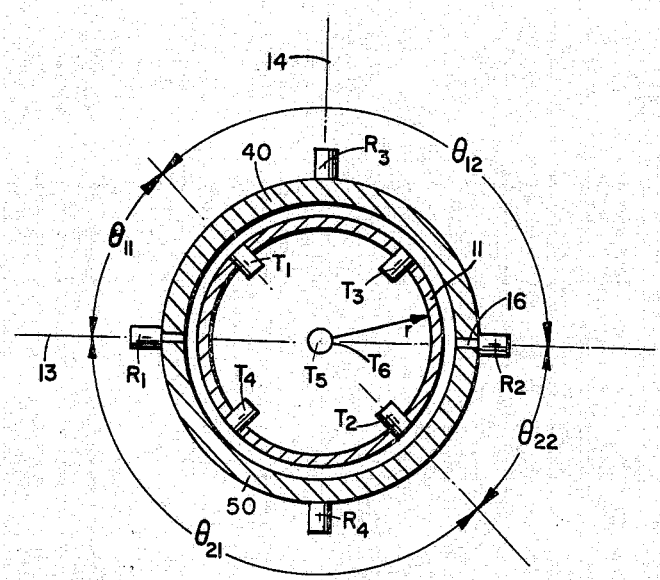
FIG. 2 is a sectional view of the embodiment of FIG. 1 taken along the line 2—2.

Referring now to FIGS. 1 and 2, a preferred embodiment of the device of the invention as incorporated into a floated inertia reference system is shown. The inertial reference system is comprised of an inertial platform 11 (inner sphere) which is supported by a fluid 12 for rotation within a supporting structure (outer sphere 10), which is comprised of hemispheres 40 and 50 separated by an insulating ring 16. Although the inner sphere is rotatable within the outer sphere, the relative translational relationship of the spheres is substantially fixed.

Within the inner sphere 11 there are mounted gyroscopes and stabilization servos as well as accelerometers (not shown) which maintain the inner sphere in a fixed position relative to inertial space or a predetermined coordinate system and measure linear velocity in the defined coordinate system. The instruments and associated hardware necessary to maintain the inner sphere in a fixed position and measure acceleration form no part of the present invention and are therefore not shown.

Transmission of power from the outer sphere to the inner sphere is accomplished by means of brushes (not shown) mounted on the inner sphere which make contact with the insulated hemispheres 40 and 50 of the outer sphere. Other means well known to those persons skilled in the art may be used to transmit power from the outer sphere to the inner sphere. An example of such a power transmitting means is disclosed in the aforementioned U.S. Patent No. 3,056,303.

The fluid 12 used to support the inner sphere in a neutral buoyant state may be a non-conducting fluid such as silicon.

The mutually orthogonal axes 13, 14 and 15 form an imaginary set of coordinates which originate at the centers of spheres 10 and 11.

Along each axis 13, 14 and 15 there are attached to opposite sides of sphere 10 pairs of receivers, $R_1$–$R_2$, $R_3$–$R_4$ and $R_5$–$R_6$, respectively. The receivers need only make solid mechanical contact with the outside wall of sphere 10.

The inner sphere 11 has attached through its surface three pairs of transmitters which make contact with the fluid 12, $T_1$–$T_2$, $T_3$–$T_4$ and $T_5$–$T_6$. The transmitters are positioned on sphere 11 along a set of orthogonal axes which may initially correspond identically to axes 13, 14 and 15. As shown in FIGS. 1 and 2, the transmitters are displaced about axis 15 by an angle $\theta_{11}$.

The transmitters and receivers used were of the piezoelectric type manufactured by Electra Scientific Corporation under the tradename "Electra-Mite." Other types of transmitters and receivers may be used as would be obvious to those persons skilled in the art. The transmitters and receivers are operated in the ultrasonic frequency range.

In operation a transmitter $T_1$, for example, is pulsed. The ultrasonic wave traveling the shortest distance is first received by receivers $R_1$ and $R_2$. The time difference between receptions of the leading edge of the wave by $R_1$ and $R_2$ is proportional to the shortest angular distance, great circle angle, between the transmitter $T_1$ and receivers $R_1$ and $R_2$. A similar procedure is followed for transmitter $T_2$ and receivers $R_1$ and $R_2$. By measuring this angle twice with diametrically opposite transmitters and receivers, all repeatable delays are cancelled.

The operation of transmitter pairs $T_3$-$T_4$ and $T_5$-$T_6$ along with receivers $R_3$-$R_4$ and $R_5$-$R_6$ is identical. In the basic form one pair of transmitters and two receivers may be used to indicate the angular position of the two elements. Three pairs of transmitters and receivers are required so as to eliminate the overlapping signal condition whenever a transmitter and receiver pair are aligned along the same axis.

The desired angle, in this one-axis example $\theta_{11}$, may be calculated from the following:

$D_{T1}$=delay of transmitter $T_1$: $\theta_{11}+\theta_{12}=\pi$
$D_{T2}$=delay of transmitter $T_2$: $\theta_{22}+\theta_{21}=\pi$
$D_{R1}$=delay of receiver $R_1$: $\theta_{11}=\theta_{22}$
$D_{R2}$=delay of receiver $R_2$: $\theta_{12}=\theta_{21}$
$r$=radius of sphere 11
$v$=velocity of ultrasonic wave Sequence:
Transmit on $T_1$, receive on $R_1$ and $R_2$, measure time difference $$t_{11}-t_{12}$$

Transmit on $T_2$, receive on $R_2$ and $R_1$, measure time difference $$t_{22}-t_{21}$$

The following equations apply:

$$t_{11}=\frac{\theta_{11}r+D_{T1}+D_{R1}}{v}$$

$$t_{12}=\frac{\theta_{12}r+D_{T1}+D_{R2}}{v}=\frac{(\pi-\theta_{11})r+D_{T1}+D_{R2}}{v}$$

$$t_{22}=\frac{\theta_{22}r+D_{T2}+D_{R2}}{v}$$

$$t_{21}=\frac{\theta_{21}r+D_{T2}+D_{R1}}{v}=\frac{(\pi-\theta_{22})r+D_{T2}+D_{R1}}{v}$$

combining:

$$\theta_{11}=\frac{v}{4r}[t_{11}-t_{12}+t_{22}-t_{21}]+\frac{\pi}{2}$$

Figure 3:
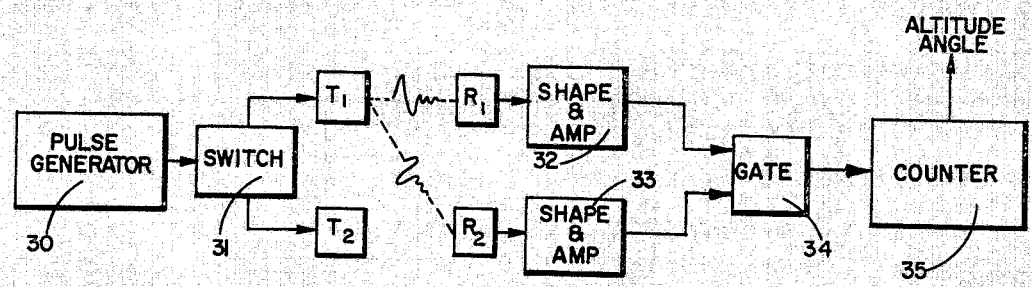
FIG. 3 is a block diagram of asssociated electronics which may be used with the invention.

Referring now to FIG. 3, a pulse generator 30 provides pulses at a predetermined frequency alternately to the transmitters $T_1$ and $T_2$ at a rate which is determined by the switch 31. The ultrasonic radiation from transmitters $T_1$ and $T_2$ is received by receivers $R_1$ and $R_2$ which are connected to the shape and amplify circuits 32 and 33, respectively. The output from circuits 32 and 33 are fed to a gate 34 which turns a counter 35 on and off. The time recorded on the counter 35 is therefore the time between pulses received on receivers $R_1$ and $R_2$ and is therefore proportional to the attitude angle. An identical set of electronics may be used or time shared for each of the remaining transmitter-receiver pairs. Additional pairs is recorded in great circle coordinates and may be pairs is recorded in great circle coordination and may be converted to three dimensional enter angles in the computer if required.

The device of this invention thus provides a highly efficient means of determining the attitude of two associated elements in three dimensions.

Although the invention has been described and illustrated in detail, it is to be clearly understood that the same is by way of illustration and example only.

I claim:
1. An attitude readout device comprising:
an inertial platform;
an inertial supporting element;
said element rotatably mounted in a substantially fixed relationship with respect to said inertial platform;
transmitter means mounted on said inertial platform;
a first and second receiver means displaced from each other and mounted on said supporting element;
means responsive to said first and second receivers for determining the difference in time between a signal received from said transmitter at said first receiver, and the same signal received at said second receiver, such that said time difference is an indication of the rotation attitude of said platform and supporting element with respect to each other.

2. In an inertial measuring unit having an inner inertial element supported with freedom of attitude by a supporting outer element a means for determining the attitude of said inner inertial element with respect to said outer element comprising:
transmitting means mounted on one of said inner or outer elements for transmitting ultrasonic waves through circumferential paths substantially defined by said inner and outer elements;
receiver means mounted on the other of said inner or outer elements for detecting said transmitted ultrasonic waves;
means responsive to said receiver means for determining the difference in time between receiving transmitted ultrasonic wave which has traversed through a first circumferential path and an ultrasonic wave which has traversed through an opposite circumferential path such that said difference in time is indicative of the attitude of said inner spherical element with respect to said outer spherical element.

3. The device of claim 2 wherein said transmitting means is comprised of pairs of transmitters, each transmitter of said pairs of transmitters mounted to said inner element directly opposite each other.

4. The device of claim 3 wherein said receiving means is comprised of pairs of receivers, each receiver of said pairs of receivers mounted to said outer element directly opposite each other.

5. The device of claim 4 wherein said pairs of receivers are disposed 90° from each other and said pairs of transmitters are disposed 90° from each other.

6. The device of claim 5 wherein each transmitter of said pairs of transmitters alternately transmits a signal such that said determined difference in time of each transmitter of said pair is compared to more accurately determine the respective attitude of said elements.

References Cited

UNITED STATES PATENTS

| 1,589,039 | 6/1926 | Anschutz-Kaempfe | 33—226 |
| 3,301,071 | 1/1967 | Shalloway | 74—5.6 |
| 3,313,161 | 4/1967 | Nordsieck | 74—5.6 |
| 3,323,378 | 6/1967 | Powell | 74—5.6 |
| 3,365,799 | 1/1968 | Fisher | 33—10 |

WILLIAM D. MARTIN, JR., Primary Examiner

U.S. Cl. X.R.

74—56